US010286454B2

(12) United States Patent
Igarashi (10) Patent No.: US 10,286,454 B2
(45) Date of Patent: May 14, 2019

(54) COMPOSITE PART AND CUTTING TOOL (71) Applicant: MITSUBISHI MATERIALS CORPORATION, Tokyo (JP)

(72) Inventor: Makoto Igarashi, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 175 days.

(21) Appl. No.: 15/127,312

(22) PCT Filed: Mar. 24, 2015

(86) PCT No.: PCT/JP2015/058869
§ 371 (c)(1),
(2) Date: Sep. 19, 2016

(87) PCT Pub. No.: WO2015/146966
PCT Pub. Date: Oct. 1, 2015

(65) Prior Publication Data
US 2017/0120344 A1 May 4, 2017

(30) Foreign Application Priority Data
Mar. 24, 2014 (JP) ................................. 2014-059529

(51) Int. Cl.
B23B 27/14 (2006.01)
B23B 27/18 (2006.01)
(Continued)

(52) U.S. Cl.
CPC ................ B23B 27/18 (2013.01); B22F 7/06 (2013.01); C22C 9/06 (2013.01); C22C 14/00 (2013.01);
(Continued)

(58) Field of Classification Search
USPC .......... 51/307, 309; 428/216, 336, 457, 469, 428/472, 698, 704
See application file for complete search history.

(56) References Cited

U.S. PATENT DOCUMENTS 3,652,237 A * 3/1972 Mizuhara ........... B23K 35/0238
428/583
3,667,099 A 6/1972 Palmer
(Continued)

FOREIGN PATENT DOCUMENTS

CN 1190914 A 8/1998
CN 1269272 A 10/2000
(Continued)

OTHER PUBLICATIONS

Guo et al "Effect of temperature on the microstructure and bonding strength of partial transient liquid phase bonded WC-Co/40Cr joints using Ti/Ni/Ti interlayers" Int. Journals Metals & Hard Materials 51 (20015) p. 250-257.*
(Continued)

*Primary Examiner* — Archene A Turner
(74) *Attorney, Agent, or Firm* — Leason Ellis LLP (57) ABSTRACT

A composite part includes: a cutting edge part made of cubic boron nitride sintered material or WC-based cemented carbide; a cutting tool body made of cemented carbide; and a bonding part between the cutting edge part and the cutting tool body. A primarily TiC layer containing 50 area % or more of TiC is formed in an interface between the cemented carbide and the bonding part, and has a thickness of 0.5-3 μm. Ti—Ni enriched layer containing each of Ti and Ni at 30 atomic % or more is formed adjacent to the primarily TiC layer and has a thickness of 0.3-3 μm. An intermittent net structure containing each of Ti, Ni and C at 10 atomic % or more is formed adjacent to the primarily TiC layer. A straight
(Continued)

line overlapping with a major axis of each of crystal grains intersects 3 or more other crystal grains.

9 Claims, 2 Drawing Sheets

(51) Int. Cl.
| | |
|---|---|
| *C22C 26/00* | (2006.01) |
| *B22F 7/06* | (2006.01) |
| *C22C 29/08* | (2006.01) |
| *C22C 9/06* | (2006.01) |
| *C22C 14/00* | (2006.01) |
| *C22C 19/00* | (2006.01) |
| *C22C 19/03* | (2006.01) |
| *C22C 29/02* | (2006.01) |
| *C23C 30/00* | (2006.01) |
| *B23C 5/18* | (2006.01) |
| *B22F 5/00* | (2006.01) |

(52) U.S. Cl.
CPC ............ *C22C 19/007* (2013.01); *C22C 19/03* (2013.01); *C22C 26/00* (2013.01); *C22C 29/02* (2013.01); *C22C 29/08* (2013.01); *C23C 30/005* (2013.01); *B22F 2005/001* (2013.01); *B23B 2222/28* (2013.01); *B23B 2224/28* (2013.01); *B23B 2226/125* (2013.01); *B23B 2228/105* (2013.01); *B23C 5/18* (2013.01); *C22C 2026/003* (2013.01)

(56) References Cited

U.S. PATENT DOCUMENTS

| | | | | |
|---|---|---|---|---|
| 6,155,755 | A * | 12/2000 | Kanada | B23B 27/18 428/698 |
| 2004/0134966 | A1 * | 7/2004 | Chang | B21B 1/38 228/235.2 |
| 2011/0020082 | A1 * | 1/2011 | Ozaki | B23K 1/0004 428/457 |
| 2012/0034474 | A1 | 2/2012 | Ozaki et al. | |
| 2013/0236240 | A1 * | 9/2013 | Ishida | B23K 1/0004 403/272 |
| 2013/0260165 | A1 * | 10/2013 | Kobayashi | B32B 7/12 428/469 |

FOREIGN PATENT DOCUMENTS

| | | | |
|---|---|---|---|
| CN | 101102863 A | | 1/2008 |
| JP | 07-040106 A | | 2/1995 |
| JP | 09-314358 | * | 12/1997 |
| JP | 11-320218 A | | 11/1999 |
| JP | 2000-288804 A | | 10/2000 |
| JP | 2008-100348 A | | 5/2008 |
| JP | 2009-131917 A | | 6/2009 |
| JP | 2010-274287 A | | 12/2010 |
| JP | 2011-025333 | * | 2/2011 |
| JP | 2012-111187 A | | 6/2012 |
| WO | WO-2012/144502 A | | 10/2012 |

OTHER PUBLICATIONS

Sun et al "A novel Zr—Ti—Ni—Cu eutectic system with low melting temperature for the brazing of Titanium allys near 800 C" Journal of Mat Research vol. 25, Issue 2 (2010) p. 296-302.*

Yeh et al "Microstructural Evolution of Brazed CP—Ti Using the Clad Ti—20Zr—20Cu—20Ni foil" Matallurgical &n Materials Transactions vol. 44A, (2010) p. 9-14.*

Office Action dated Jan. 11, 2018 for the corresponding Chinese Patent Application No. 201580025874.5.

International Search Report dated May 19, 2015 for the corresponding PCT Application No. PCT/JP2015/058869.

* cited by examiner

COMPOSITE PART AND CUTTING TOOL

CROSS-REFERENCE TO RELATED PATENT APPLICATIONS

This application is a U.S. National Phase Application under 35 U.S.C. § 371 of International Patent Application No. PCT/JP2015/058869, filed Mar. 24, 2015, and claims the benefit of Japanese Patent Application No. 2014-059529, filed Mar. 24, 2014, all of which are incorporated by reference herein in their entireties. The International Application was published in Japanese on Oct. 1, 2015 as International Publication No. WO/2015/146966 under PCT Article 21(2).

FIELD OF THE INVENTION

The present invention relates to a composite part and a cutting tool, and particularly relates to a composite part, in which a cubic boron nitride (hereinafter, referred as cBN) sintered material and WC-based cemented carbide (WC cemented carbide, which is cemented carbide mainly made of WC) are bonded, and a cutting tool made of the composite part.

BACKGROUND OF THE INVENTION

Recently, cutting tools such as inserts and end mills, in which cBN sintered material is used in the cutting edge part, are provided as a tool for machining molds used for manufacturing housings of the cellular phones, the smart phones, or the like. The cBN sintered material exhibits high productivity and long service life; and has a highest hardness next to diamonds.

However, the cBN sintered material itself is hard to be machined, and expensive. Furthermore, usage of the cBN sintered material is restricted since the shape of sintered material is limited to discoid shapes and the tool shape cannot be formed freely.

Despite the difficulty of machining tools, there are growing applications of the cBN sintered material recently with increase of the amount of difficult-to-cut materials. As a method to overcome the problems of the production cost and workability, a cutting tool is proposed. In the cutting tool, a cutting tool body made of WC-based cemented carbide; and a cutting edge part, the material of which is the cBN sintered material, are bonded by brazing the cutting tool body made of WC-based cemented carbide, which is inexpensive and has excellent workability, and the cutting edge part, the material of which is the cBN sintered material. In addition, not only the cBN sintered materials, but several technologies relating to composite parts made of the cutting tool body made of the WC-based cemented carbide and other material are proposed.

For example, a technology is proposed in Japanese Unexamined Patent Application, First Publication No. H11-320218 (A), in which the cBN sintered material is bonded to the cutting tool body made of WC-based cemented carbide strongly by forming a bonding part made of: one or more of Ti and Zr at 15 to 65 weight %; and Cu without occurrence of splitting or cracking of the cBN sintered material in a cutting tool in which the cBN sintered material is bonded on the cutting tool body made of WC-based cemented carbide through the bonding part.

In addition, improvement of the bonding strength between the cemented carbide part and the steel part is described Japanese Unexamined Patent Application, First Publication No. 2009-131917 (A). Japanese Unexamined Patent Application, First Publication No. 2009-131917 (A) relates to: the composite material of a cemented carbide part and a steel part, in which the cemented carbide part and the steel part are bonded through a bonding layer; and a cutting tool such as end mills, drills, and the like, on which cutting edge processing is performed to the cemented carbide part of the composite material. The bonding strength between the cemented carbide part and the steel part is improved: by having the bonding layer made of Ni on the side contacting the cemented carbide part; by having the bonding layer made of the Ni—Cu alloy on the side contacting the steel part; and by forming the Cu diffusing region, in which the Cu content reduces with distance from the bonding surface, in the vicinity of the bonding surface between the steel part and the bonding layer.

In addition, it is proposed that cutting blade having less residual stress and high bonding strength can be obtained: by bonding the blade part made of cemented carbide and the body part made of carbon tool steel through the nickel or cobalt foil; by irradiating laser on the bonding part; and bonding the blade part and the body part through the alloy layer, in Japanese Unexamined Patent Application, First Publication No. 2008-100348 (A).

In addition, improvement of bonding strength between the cBN-based sintered material and the cutting tool body made of WC-based cemented carbide is disclosed in Japanese Unexamined Patent Application, First Publication No. 2012-111187 (A). In Japanese Unexamined Patent Application, First Publication No. 2012-111187 (A), the cBN-based sintered material is bonded on the cutting tool body made of WC-based cemented carbide through the bonding part. In addition, the titanium nitride compound layer having the layer thickness of 10 nm to 300 nm is formed in the interface between the cBN-based sintered material and the bonding part; and the layer thickness of the bonding part on the back surface of the cBN-based sintered material is thinner than the layer thickness of the bonding part on the bottom surface.

Problems to be Solved by the Present Invention

It is disclosed that strong bonding strength can be obtained by using a Ti-based metal in the cutting tool proposed in Japanese Unexamined Patent Application, First Publication No. H11-320218 (A). However, there is a problem that in the case where Ti diffuses too extensively, the mechanical property of the cemented carbide shank and the cutting tool body made of cemented carbide on the cutting edge side deteriorates, causing breakage thereof.

The composite material and the cutting tool made of the composite material proposed in Japanese Unexamined Patent Application, First Publication No. 2009-131917 (A) exhibit a certain level of performance in cutting work under the standard condition. However, the bonding strength is not sufficient under the heavy cutting condition where high load is applied on the cutting edge; and it is possible that breakage occurs from the bonding part.

The cutting blade proposed in Japanese Unexamined Patent Application, First Publication No. 2008-100348 (A) is the tool for cutting glass fibers in a constant length; and it cannot be used as the cutting tools of steel, cast iron, or the like.

The bonded body, which has the titanium nitride compound layer having the layer thickness of 10 nm to 300 nm, proposed in Japanese Unexamined Patent Application, First Publication No. 2012-111187 (A) is not compatible with the reaction to the bonding material and the cBN-based sintered material, and has the problem that sufficient bonding strength cannot be obtained.

SUMMARY OF THE INVENTION

Means to Solving the Problems

Under the circumstances described above, the inventors of the present invention conducted extensive studies about a way to improve the bonding strength of the bonding part in: the composite part made of the cBN sintered material and the WC-based cemented carbide, such as a composite sintered material in which the cBN sintered material is bonded to the WC-based cemented carbide concurrently with sintering of the cBN sintered material during ultra-high pressure and high temperature sintering; and a cutting tool in which a cutting edge part made of a single body of a cBN sintered material and a base body made of WC-based cemented carbide are bonded through a bonding part, in order to solve the problems of the above-described conventional composite part and the cutting tool made of the conventional composite part.

(1) The inventors of the present invention found that the bonding strength in the interface between the cemented carbide and the bonding part is improved by: forming a primarily TiC layer in the interface between the cemented carbide and the bonding part in a predetermined layer thickness; forming a layer containing Ti and Ni at a certain amount or more in a predetermined layer thickness; and forming an intermittent net structure adjacent to the primarily TiC layer during bonding the cBN sintered material and the WC-based cemented carbide, or the WC-based cemented carbide and the WC-based cemented carbide, through the bonding part made of: a Ti—Ni laminated foil; a Ti—Ni alloy foil; or a mixed powder containing Ti and Ni.

(2) In addition, in terms of the interface between the cBN sintered material and the bonding part, the inventors of the present invention found that bonding strength in the interface between the cBN sintered material and the bonding part is improved by forming the needle structure containing Ti, B, and N adjacent to the cBN grains.

(3) Accordingly, the inventors of the present invention found that occurrence of breakage from the bonding part can be prevented in the composite part; it can exhibit excellent cutting performance for a long-term usage, even if the cutting tool manufactured from the composite part is subjected to heavy cutting work of steel or cast iron where high load is applied on the cutting edge, since the bonding strength of the bonding part is improved in the composite part made of the cBN sintered material and the WC-based cemented carbide; or the WC-based cemented carbide and the WC-based cemented carbide, which has the interface structure according to the above-described (1) and (2).

The present invention is made based on the above-described findings, and has aspects indicated below.

(1) A composite part including: a cutting edge part made of cubic boron nitride sintered material or WC-based cemented carbide and containing a cutting edge; a cutting tool body made of WC-based cemented carbide; and a bonding part provided between the cutting edge part and the cutting tool body and bonding the cutting edge part and the cutting tool body, wherein (a) a primarily TiC layer containing 50 area % or more of TiC is formed in an interface between the cemented carbide and the bonding part on a side of the bonding part, the primarily TiC layer having an average layer thickness of 0.5 μm to 3 μm; and a Ti—Ni enriched layer containing each of Ti and Ni at 30 atomic % or more is formed adjacent to the primarily TiC layer, the Ti—Ni enriched layer having an average layer thickness of 0.3 μm to 3 μm, and (b) an intermittent net structure containing each of Ti, Ni and C at 10 atomic % or more is formed adjacent to the primarily TiC layer on a side of the bonding part, the intermittent net structure having an average width of 10 nm to 200 nm, and a straight line overlapping with a major axis of each of crystal grains containing each of Ti, Ni, and C at 10 atomic % or more intersecting, on average, 3 or more other crystal grains containing each of Ti, Ni, and C at 10 atomic % or more.

(2) The composite part according to the above-described (1), wherein a TiC content in the primarily TiC layer is 80 area % or less.

(3) The composite part according to the above-described (1), wherein a Ti content in the Ti—Ni enriched layer is 55 atomic % or less.

(4) The composite part according to the above-described (1), wherein a Ti content in the Ti—Ni enriched layer is 40 atomic % or more and 55 atomic % or less.

(5) The composite part according to the above-described (1), wherein a Ni content in the Ti—Ni enriched layer is 70 atomic % or less.

(6) The composite part according to the above-described (1), wherein a Ni content in the Ti—Ni enriched layer is 45 atomic % or more and 70 atomic % or less.

(7) The composite part according to the above-described (1), wherein the cutting edge part is made of cubic boron nitride sintered material, and a needle structure containing each of Ti, B, and N at 10 atomic % or more is formed adjacent to the cubic boron nitride grains on the side of the bonding part in the interface between the cubic boron nitride sintered material and the bonding part, the needle structure having an average size in a longitudinal direction of 0.1 μm to 3 μm and an average aspect ratio of 5 or more.

(8) A cutting tool comprising the composite part according to any one of the above-described (1) to (6).

Effects of the Invention

An aspect of the present invention is the composite part, in which the cBN sintered material and the WC-based cemented carbide or the WC-based cemented carbide and the WC-based cemented carbide are bonded through the bonding part containing at least each of Ti and Ni at 10 atomic % or more. In the interface between the WC-based cemented carbide and the bonding part, the primarily TiC layer having the predetermined layer thickness and the predetermined TiC area ratio is formed. In addition, the Ti—Ni enriched layer having the predetermined layer thickness is formed; and the intermittent net structure containing Ti, Ni, and C at the predetermined contents is formed adjacent to the primarily TiC layer. Because of these, the bonding strength between the WC-based cemented carbide and the bonding part is improved.

Moreover, in the case where the cBN sintered material and the WC-based cemented carbide are used, the needle structure is formed adjacent to the cBN grains in the interface between the cBN sintered material and the bonding part. Because of this, the bonding strength between the cBN sintered material and the bonding part is increased.

Accordingly, breakage does not occur from the bonding part in the cutting tool constituted of the above-described composite part; and the cutting tool exhibits excellent cutting performance for a long-term usage even in the case where the cutting is subjected to heavy cutting work in which high load is applied on the cutting edge.

DETAILED DESCRIPTION OF THE INVENTION

Embodiments of the present invention are explained below.

Figure 1:
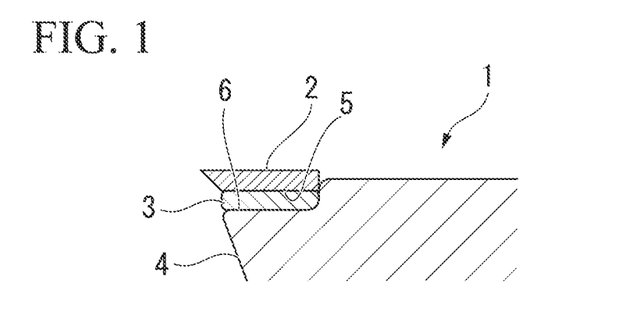
FIG. 1 is a vertical cross-section diagram in an embodiment of the cutting tool of the present invention and shows positional relationship of the cutting edge part, the bonding part, and the cutting tool body in the embodiment.

FIG. 1 is a vertical cross-section diagram in an embodiment of the cutting tool of the present invention and shows positional relationship of the cutting edge part 2, the bonding part 3, and the cutting tool body 4 in the embodiment. The cutting edge part 2 is bonded to the cutting tool body 4 through the bonding part 3. The bonding part 3 exists between the bonding surface 5 of the cutting edge part and the bonding surface 6 of the cutting tool body. The bonding surface 5 of the cutting edge part is the surface formed on the lower surface side of the cutting edge part 2. The bonding surface 6 of the cutting tool body is the surface formed on the upper surface side of the cutting tool body 4.

FIG. 1 is a schematic diagram and the dimension of each component shown in FIG. 1 does not correspond to the actual dimension necessarily. For example, the thickness of the bonding part 3 may be significantly thinner than that shown in the drawing.

Composition of the bonding part 3 mainly depends on the composition of the bonding material, which is the precursor of the bonding part 3. In addition, the bonding condition; the composition of the cutting edge part 2; and the composition of the cutting tool body 4 have influence on the composition of the bonding part 3.

The composite part 1 of the present invention is constituted by bonding: the cBN sintered material (the cutting edge part made of the cBN sintered material) and the WC-based cemented carbide (the cutting tool body made of the WC-based cemented carbide); or the WC-based cemented carbide (the cutting edge part made of the WC-based cemented carbide) and the WC-based cemented carbide (the cutting tool body made of the WC-based cemented carbide), through the bonding part 2 containing at least each of Ti and Ni at 10 atomic % or more. In addition, the cutting tool of the present invention is constituted: by utilizing the cBN sintered material or the WC-based cemented carbide of the composite part 1 as the cutting edge part 3; and by utilizing the WC-based cemented carbide of the composite part 1 as the cutting tool body 4 on the other hand.

If the Ti content in the bonding part 3 were less than 10 atomic %, the average layer thickness of the primarily TiC layer 9, which contains TiC at 50 area % or more, in the interface between the bonding part 3 and the WC-based cemented carbide, would be less than 0.5 μm; and the improvement of the bonding strength in the interface between the bonding part 3 and the WC-based cemented carbide could not be expected. Thus, The Ti content in the bonding part 3 is set to 10 atomic % or more. The upper limit of the Ti content in the bonding part 3 is 85 atomic % in consideration of the balance with the other essential elements. More preferably, the range of the Ti content in the bonding part 3 is 20 atomic % or more and 85 atomic % or less. Even more preferably, the range of the Ti content in the bonding part 3 is 20 atomic % or more and 60 atomic % or less.

In addition, Ni contained in the bonding part 3 has a function to improve wettability of the interface between the bonding part 3 and the WC-based cemented carbide significantly. Because of this, the surface of the WC-based cemented carbide is uniformly wetted over by the bonding material during bonding. Consequently, the primarily TiC layer 9 formed in the interface to the WC-based cemented carbide would not become the granular structure or the columnar structure, and would be formed as the structure on the layer.

However, if the Ni content in the bonding part 3 were less than 10 atomic %, it would be difficult to obtain the above-described effect. Thus, the Ni content in the bonding part 3 is set to 10 atomic % or more in the present invention. The upper limit of the Ni content in the bonding part 3 is 85 atomic % in consideration of the balance with the other essential elements. More preferably, the range of the Ni content in the bonding part 3 is 20 atomic % or more and 85 atomic % or less. Even more preferably, the range of the Ni content in the bonding part 3 is 40 atomic % or more and 85 atomic % or less.

Figure 2:
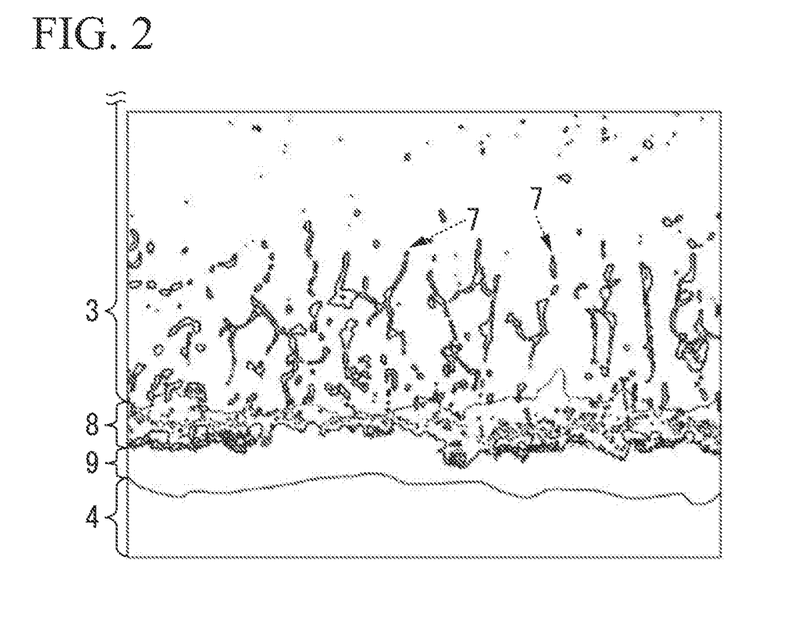
FIG. 2 is a schematic diagram of a cross section of the interface between the WC-based cemented carbide and the bonding part of the composite part of the present invention, and shows the WC-based cemented carbide, the primarily TiC layer, the Ti—Ni enriched layer, the intermittent net structure, and the bonding part.

As shown in FIG. 2, the primarily TiC layer 9 containing TiC at 50 area % or more is formed in the interface between the bonding part 3 and the WC-based cemented carbide. If the TiC content ratio in this layer were less than 50 area %, the reaction with WC contained in the WC-based cemented carbide would not be sufficient; and the interface strength would not be exhibited sufficiently. Thus, it is necessary to set the TiC content ratio in the primarily TiC layer 9 to 50 area % or more. In addition, if the average layer thickness of this layer were less than 0.5 μm, the effect of the bonding strength improvement in the interface (the bonding surface 6 of the cutting tool body) between the bonding part 3 and the WC-based cemented carbide could not be obtained. On the other hand, if the average layer thickness exceeded 3 μm, the primarily TiC layer 9 would become brittle; cracks would be transmitted throughout the primarily TiC layer 9; and consequently, sufficient bonding strength could not be obtained. Thus, the average layer thickness of the primarily TiC layer 9 is set to 0.5 μm to 3 μm.

In addition, as shown in FIG. 2, the Ti—Ni enriched layer 8, which has the average layer thickness of 0.3 μm to 3 μm and contains each of Ti and Ni at 30 atomic % or more, is formed in the interface between the bonding part 3 and the WC-based cemented carbide. The Ti—Ni enriched layer 8 is formed on the side of the bonding part adjacent to the primarily TiC layer 9. If any one of the Ti content and the Ni content in the Ti—Ni enriched layer 8 were less than 30 atomic %, wettability to the primarily TiC layer 9 and the bonding part 3 could not be exhibited; voids would be formed in the Ti—Ni enriched layer 8; and the voids would be a starting point of peeling. Thus, it is necessary to set each of the Ti content and the Ni content in the Ti—Ni enriched layer 8 to 30 atomic % or more.

In addition, if the average layer thickness of the Ti—Ni enriched layer 8 were less than 0.3 μm, excellent wettability to both of the primarily TiC layer 9 and the bonding part 3 would not be exhibited; and voids would likely be formed. On the other hand, if the average layer thickness exceeded 3 μm, stress due to difference of coefficient of thermal expansion to the WC-based cemented carbide would be excessive; and interface peeling would likely occur. Thus, the average layer thickness of the Ti—Ni enriched layer 8 is set to 0.3 μm to 3 μm.

As shown in FIG. 2, the intermittent net structure 7 is formed adjacent to the primarily TiC layer 9, which is formed in the interface (the bonding surface of the cutting edge part or the bonding surface of the cutting tool body) between the bonding part 3 and the WC-based cemented carbide of the present invention, on the side of bonding part. The intermittent net structure 7 contains each of Ti, Ni and C at 10 atomic % or more, and has the average width of 10 nm to 200 nm. In addition, the straight line overlapping with a major axis of each of crystal grains containing each of Ti, Ni, and C at 10 atomic % or more intersects, on average, 3 or more other crystal grains containing each of Ti, Ni, and C at 10 atomic % or more.

In the case where the shape of the crystal grain is curved or branched; and it is hard to specify the major axis of the crystal grain, the major axis is defined as the longest line drawn in the shape of the crystal grain.

The intermittent net structure 7 exhibits stronger anchoring effect because the net structure presents traversing the Ti—Ni enriched layer 8 vertically. On the other hand, if the net structure were continuous, distortion due to the difference between the lattice constant formed in the interface to the matrix; and stress due to the difference in coefficient of thermal expansion could not be relaxed. Accordingly, cracks would be formed by concentration of stress on the continuous net structure; the cracks would become starting points of peeling; and the bonding part could not exhibit sufficient bonding strength. By having the intermittent net structure instead of the continuous net structure, stress acting on the intermittent net structure is dispersed. Thus, cracks or the like would not be formed in the intermittent net structure; and the intermittent net structure 7 has the effect improving the bonding strength between the bonding part 3 and the WC-based cemented carbide.

The reason for setting each of the contents of Ti, Ni, and C, which are components constituting the intermittent net structure 7, to 10 atomic % or more is that the property as the Ti and Ni complex carbide improves the bonding strength to the primarily TiC layer 9; the Ti—Ni enriched layer 8; and the bonding part 3. If any one of the contents of Ti, Ni, and C were less than 10 atomic %, the above-described effect could not be exhibited sufficiently. Thus, each of the contents of Ti, Ni, and C is set to 10 atomic % or more.

In addition, if the average width of the intermittent net structure 7 were less than 10 nm, the crystal grain having the length equals to or longer than the layer thickness of the Ti—Ni enriched layer 8 would be difficult to be formed; and sufficient anchoring effect could not be expected. On the other hand, if the average width of the intermittent net structure 7 exceeded 200 nm, the bonding strength of the interface between the bonding part 3 and the WC-based cemented carbide would be reduced. Thus, the average width of the intermittent net structure 7 is set to 10 nm to 200 nm.

In terms of the crystal grains, which contain each of Ti, Ni, and C at 10 atomic % or more, of the intermittent net structure 7 (hereinafter, referred as "net structure crystal grains"), if the number of the other crystal grains, which are intersected by the straight line overlapping with the major axis of each net structure crystal grain containing each of Ti, Ni, and C at 10 atomic % or more, (hereinafter referred as "the number of grains intersected by the extended straight line") were less than 3 on average, stress relaxation due to dispersedly arranging the net structure crystal grains would not be sufficient; and peeling due to stress concentration in the interface would likely be induced. Thus, it is necessary to set the number of grains intersected by the extended straight line to 3 crystal grains or more on average.

Figure 3:
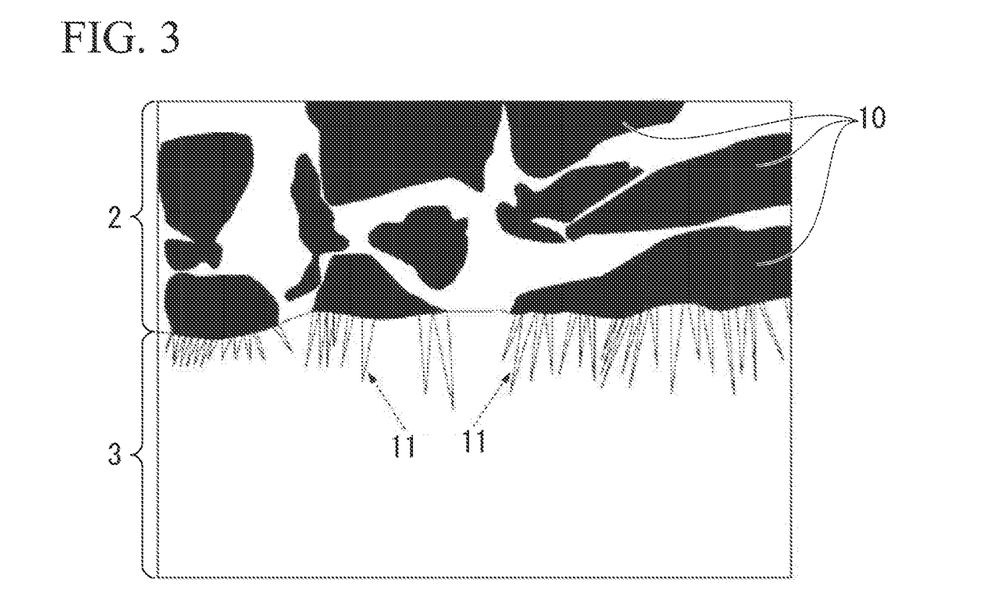
FIG. 3 is a schematic diagram of a cross section of the bonding part on the side of the cBN sintered material of the composite part of the present invention, in the case where the cBN sintered material and the WC-based cemented carbide are used, and shows the cBN sintered material, the needle structure, and the bonding part.

In addition, as shown in FIG. 3, in the case where the cutting edge part 2 is the cBN sintered material and the cutting tool body is the WC-based cemented carbide, the crystal structure 11 in the needle shape (hereinafter referred as "the needle structure") is formed adjacent to the cBN grains in the interface between the cBN sintered material and the bonding part (the interface 5 of the cutting edge part) on the side of the bonding part 3. This needle structure 11 is the structure, which is formed by reaction of Ti in the bonding part 3 with the cBN grain and contains Ti, B, and N.

The needle structure 11 exhibits significant anchoring effect, and improves the bonding strength between the cBN sintered material and the bonding part 3.

However, if the average aspect ratio of the needle structure 11 were less than 5 or the average size in the longitudinal direction of the needle structure 11 were 0.1 μm, sufficient anchoring effect could not be exhibited. On the other hand, if the average size in the longitudinal direction of the needle structure 11 exceeded 3 μm, the crystal grains would be coarsened; the interface between the cBN sintered material and the bonding part 3 would become brittle; and strength would be reduced. Thus, it is preferable that the average aspect ratio of the needle structure 11 is set to 5 or more; and the average size in the longitudinal direction of the needle structure 11 is set to 0.1 μm to 3 μm.

In terms of the primarily TiC layer 9 and the Ti—Ni enriched layer 8 in the composite part 1 of the present invention, they can be identified by the methods explained below using the electron scanning microscope and the energy dispersive X-ray spectrometer. First, vertical cross-sectional observation is performed in a view field set in such a way that the WC-based cemented carbide occupies 5% to 10% of the view field from the interface between the bonding part 3 and the WC-based cemented carbide. Then, elemental mapping is performed in the view filed magnified 10000 times in the vertical cross-sectional surface; and the TiC phase is defined as the phase containing each of Ti and C at 30 atomic % based on the content ratios of Ti, Ni, and C. Then, the primarily TiC layer 9 is identified as the layer including 50 area % or more of the TiC phase defined as described above in the vertical cross-sectional surface. Then, a straight line is drawn orthogonal to the interface between the WC-based cemented carbide and the primality TiC layer 9 (the bonding surface 5 of the cutting edge part and the bonding surface 6 of the cutting tool body); and the thickness of the primarily TiC layer 9 is obtained as the length that the straight line traverses the primarily TiC layer 9. Then, 10 different such straight lines are drawn. The average layer thickness of the primarily TiC layer 9 is obtained by calculating the average value from 10 values obtained from these 10 different straight lines. These 10 different straight lines are drawn with an interval of 0.5 μm at least to the neighboring other line(s) within the range of 10 μm in the horizontal direction. In terms of the Ti—Ni enriched layer 8, compositional analysis is performed on the straight line orthogonal to the interface between the WC-based cemented carbide and the primarily TiC layer 9; and the Ti—Ni enriched layer 8 is identified as the region, the Ti and Ni contents of which are 30 atomic % or more. The layer thickness of the Ti—Ni enriched layer 8 is defined as the length traversing the Ti—Ni enriched layer 8, which is identified by the compositional analysis on the straight line, in the vertical direction (the direction orthogonal to the surface of the body). The average layer thickness of the Ti—Ni enriched layer 8 is obtained by calculating the average value of values obtained from 10 different straight lines drawn similar to the case of identification of the primarily TiC layer 9.

Figure 4:
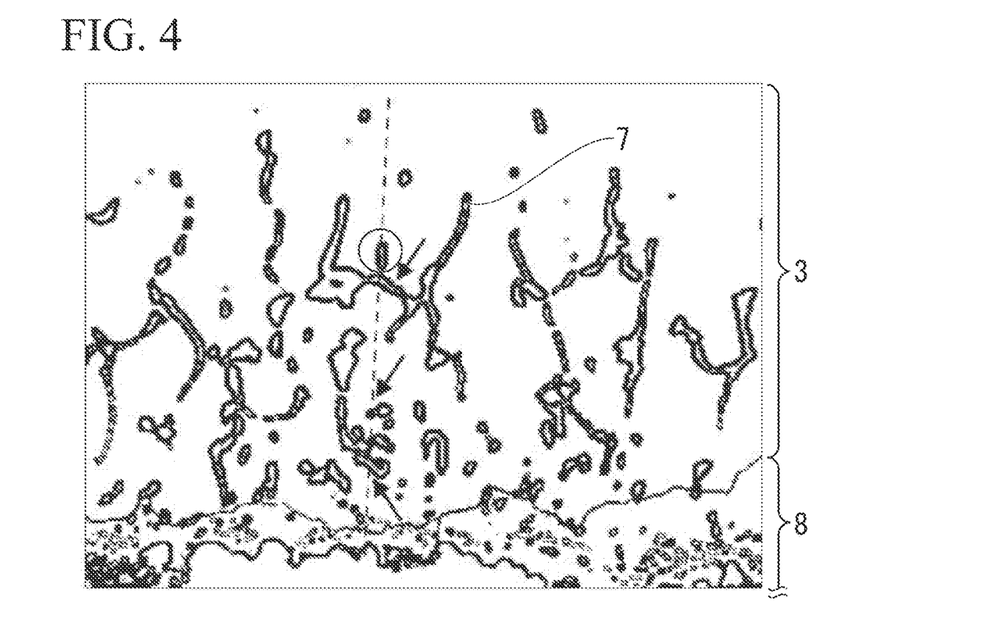
FIG. 4 is a schematic diagram showing an example for obtaining the number of the grains intersected by the extended straight line. The straight line extending the size in the longitudinal direction the crystal grain surrounded by the circle in the drawing is drawn; and each of crystal grains intersected by the extended straight line is indicted by an arrow.

In terms of the intermittent net structure 7 in the composite part 1 of the present invention, the crystals with the phase: containing each of Ti, Ni, and C at 10 atomic % or more; and not being in the form of the layer structure, are identified as the net structure crystals. Then, the longest size is defined as the size in the longitudinal direction; and the longest size in the orthogonal direction of the size in the longitudinal direction is defined as the width of the crystal grain on each of the net structure crystals. Finally, the number of the other net structure crystal grains intersected by the straight line overlapping to the size in the longitudinal direction in the view field is obtained. As shown in FIG. 4, the width of the crystal grain and the number of grains intersected by the extended straight line are obtained on each of the net structure crystals in the view field; and the average width and the average intersected grain number by the extended straight line of the intermittent net structure 7 are obtained by dividing the sums of each value by the number of the net structure crystals.

More detailed explanations of the intermittent net structure 7 are shown below.

The intermittent net structure 7 is the crystal structure constituted of groups of crystals, which are formed in the bonding part 3 in the bonding process of the cutting edge part 2 to the cutting tool body through the bonding part 3; and are in irregular shapes. The intermittent net structure 7 is adjacent to the primarily TiC layer 9 formed in the interface the bonding part 3 contacting to the WC-based cemented carbide. In addition, the intermittent net structure 7 overlaps to the Ti—Ni enriched layer 8, and formed traversing through the Ti—Ni enriched layer 8 in the orthogonal direction relative to the bonding surface of the cutting tool body. In other words, the intermittent net structure 7 is adjacent to the primarily TiC layer 9 as with the Ti—Ni enriched layer 8, and spreads toward the side of the bonding part 3 further than the Ti—Ni enriched layer 8 at the same time.

The crystal, which is the structural unit of the intermittent net structure 7, has a special elemental composition. Specifically, it contains each of Ti, Ni, and C at 10 atomic % or more. The intermittent net structure 7 is a discontinuous crystal structure dispersedly formed in the matrix made of groups of crystals not having the above-mentioned special elemental composition.

The intermittent net structure 7 can be recognized by visually observing the vertical cross-sectional surface based on the contrast and the color. However, in order to know the elemental composition precisely, it is necessary to confirm that the visually recognized intermittent net structure is the intermittent net structure 7 containing each of Ti, Ni, and C at 10 atomic % or more by performing elemental mapping on the vertical cross-sectional surface.

Being intermittent or not is judged by: drawing a square of 5 μm (on the vertical direction)×5 μm (on the horizontal direction) in the vertical cross-sectional surface; and counting the number of crystal grains, which are intersected by the lines (the length of 5 μm) drawn in the square vertically and horizontally and contain each of Ti, Ni, and C at 10 atomic % or more. The square is drawn in such a way that the bottom side of the square is parallel to the bonding surface of the cutting tool body and touches to the most overhanging portion of the primarily TiC layer on the side of the bonding part 3. In the square, 5 vertical lines and 5 horizontal lines (the length of 5 μm each) are drawn. The intervals between the neighboring lines are set to a constant value, and the neighboring lines are spaced at least 0.5 μm each other. In the case where the line overlaps with a crystal but does not penetrate through the crystal at the ends of the line, it is not regarded as the crystal being intersected by the line.

Then, the average value of crystal grains intersected per one vertical line is calculated from the numbers of crystals intersected by the 5 vertical lines. Similarly, the average value of crystal grains intersected per one horizontal line is calculated from the numbers of crystals intersected by the 5 horizontal lines. Then, when the average numbers of the crystals intersected by the vertical and horizontal lines are 3 or more and 20 or less, it is regarded that the net structure is intermittent.

The area ratio of the intermittent net structure 7 in the square is defined as the total area of the crystal grains containing each of Ti, Ni, and C at 10 atomic % or more in the square. The area ratio of the intermittent net structure 7 is 2% or more and 20% or less.

In the square, there are 10 or more and 300 or less of crystal grains containing each of Ti, Ni, and C at 10 atomic % or more. The number of the crystal grains counted in the square is the crystal grain number recognized in the vertical cross-sectional surface; and ones connected three-dimensionally but recognized separately in the two-dimensional cross-sectional surface are counted as different individual crystal grains.

Being net or not is judged from the shape of crystal containing each of Ti, Ni, and C at 10 atomic % or more included in the square. Specifically, the number and the shapes of the crystals containing each of Ti, Ni, and C at 10 atomic % or more in the square are obtained. Then, when 50% or more of the crystals have the aspect ratio of 2 or more, it is regarded as net. The average width of this crystal structure (the minor axis width) is 10 nm to 200 nm. In order to obtain the aspect ratio as the shape of the crystal grain, the major axis length and the minor axis length of the crystal grain are needed. The shapes of the crystal grains are complex; and it is not necessarily line symmetry with respect to the two orthogonal axes. In the case where the shape of a crystal grain is complex, for example, the shape of the crystal grain is curved or branched; and it is difficult to simply identify the major axis of the crystal grain, the longest straight line drawn in the shape of the crystal grain is regarded as the major axis. The minor axis is defined as a line orthogonal to the major axis. In the case where there are multiple minor axis widths relative to the major axis, the longest minor axis among the minor axis widths is regarded as the minor axis.

Spreading (expansion) of the intermittent net structure 7 on the side of the bonding part 3 is measured by the method explained below. The above-described square is shifted by every 1 μm continuously toward the side of the bonding part 3 in the orthogonal direction to the bonding surface 6 of the cutting tool body. When the analysis result in the shifted square deviates from at least one of the definitions of "intermittent" and "net" in the continuous monitoring, the location 2 μm below from the upper side of the square with the deviating analysis result is regarded as the boundary line of the spreading of the intermittent net structure 7 on the side of the bonding part 3.

In the actual measurement, the boundary line of spread of the intermittent net structure 7 to the side of the bonding part 3 is measured at 5 different locations. By calculating the average value obtained from the 5 different locations, the averaged boundary line of spread of the intermittent net structure 7 to the side of the bonding part 3 is obtained.

The range of the thickness of the intermittent net structure 7 observed in the direction orthogonal to the bonding surface of the cutting tool body is 3 times or more and 20 times or less of the layer thickness of the Ti—Ni enriched layer 8.

When the cBN sintered material and the WC-based cemented carbide are used, in terms of the needle structure 11 adjacent to the cBN grains, the presence or the absence of the needle structure 11 growing adjacent to the cBN crystal grain 10 is confirmed in view field set in such a way that the cBN sintered material occupies 5% to 10% of the observing region from the interface between the bonding part 3 and the cBN sintered material. Point analysis is performed on 10 crystal grains constituting the needle structure 11; and it is confirmed that the needle structure 11 contains each of Ti, B, and N at 10 atomic % or more by calculating the average value. In addition, the average size in the longitudinal direction and the average aspect ratio are obtained: by defining the longest size as the size in the longitudinal direction on each of 10 crystal grains constituting the needle structure 11; by defining the longest size orthogonal to the longitudinal direction as the size in the traversing direction; by obtaining the aspect ratio by dividing the size in the longitudinal direction by the size in the traversing direction; and by calculating average values of the 10 crystal grains.

In order to produce the composite part 1 of the present invention, for example, the Ti—Ni laminated foil; the Ti—Ni alloy foil; or the mixed powder containing Ti and Ni is used as the bonding part 3. Then, the composite part 1 is produced by performing pressure bonding by interposing the above-described bonding part 3 between: the cBN sintered material and the WC-based cemented carbide; or the WC-based cemented carbide and the WC-based cemented carbide.

More specifically, for example, the Ti foil of 1 μm to 10 μm thickness and the Ni foil of 1 μm to 10 μm thickness are prepared as the Ti—Ni laminated foils; and it is inserted and interposed between: the cBN sintered material and the WC-based cemented carbide; or the WC-based cemented carbide and the WC-based cemented carbide.

Next, it is subjected to load of 100 kPa to 3000 kPa in vacuum of 0.13 kPa or less, and retained in the temperature range of 700° C. to 900° C. for 5 minutes to 180 minutes. By following the process explained, the composite part 1 of the present invention can be produced.

Next, the present invention is specifically explained based on Examples of the present invention. Examples of the present invention are embodiments of the present invention. Thus, the scope of the present invention is not particularly limited by the descriptions of the specific embodiments of the present invention below.

Examples

The WC powder; the VC powder; the TaC powder; the NbC powder; the $Cr_3C_2$ powder; and the Co powder, each of which had the average grain size of 0.5 μm to 1 μm, were prepared as raw material powders. Then, these raw material powders were blended in the blending composition shown in Table 1, and subjected to wet-mixing for 24 hours with a ball mill. After drying, the mixed raw material powders were subjected to press molding under the pressure of 100 MPa, sintered in the condition of: vacuum of 6 Pa; the temperature at 1400° C.; and retention time for 1 hour. By following the above-described processes, 4 kinds of the WC-based cemented carbide sintered materials A-1 to A-4 shown in Table 1 were formed (hereinafter, referred as "cemented carbide").

TABLE 1

| Type | | Blending composition (mass %) | | | | | |
|---|---|---|---|---|---|---|---|
| | | Co | TaC | NbC | VC | $Cr_3C_2$ | WC |
| Cemented carbide | A-1 | 12 | — | — | — | — | balance |
| | A-2 | 10 | — | — | 1 | 0.5 | balance |
| | A-3 | 12 | — | — | — | 0.7 | balance |
| | A-4 | 8 | 2 | 1 | — | — | balance |

Next, the cBN powder; the TiN powder; the TiCN powder; the $TiB_2$ powder; the TiC powder; the MN powder; and the $Al_2O_3$ powder, each of which had the average grain size in the range of 0.5 μm to 4 μm, were prepared as the raw material powders for the cBN sintered material. Then, these raw material powders were blended in predetermined blending compositions, and subjected to wet-mixing for 24 hours with a ball mill using acetone. After drying, the mixed raw material powders were subjected to press molding into green compacts having the dimension of the diameter of 15 mm and the thickness of 1 mm under the pressure of 100 MPa. Then, these green compacts were sintered in the condition of: the temperature of 1300° C.; the pressure of 5.5 GPa; and the time of 30 minutes, by using an ultra-high pressure generator. By following the above-described processes, the cBN sintered materials B-1 and B2 were produced.

In addition, as the composite sintered materials in which the WC-based cemented carbide (hereinafter, referred as "the cemented carbide backing") was bonded concurrently with the sintering of the cBN sintered material (hereinafter, referred as "the composite sintered material"), the composite sintered materials B-3 to B-6 were produced by: providing the sintered materials made of the above-described cemented carbide A-1 to A4 having the dimension of the diameter of 15 mm and the thickness of 2 mm; stacking the above-described cBN green compacts on the cemented carbide in the combinations shown in Table 2; and sintering the stacked bodies in the condition of: the temperature of 1300° C.; the pressure of 5.5 GPa; and the time of 30 minutes, by using an ultra-high pressure generator.

In terms of the compositions of the cBN sintered materials B-1 to B2 and the cBN sintered materials of the composite sintered materials B-3 to B-6, they were obtained by regarding the area % of cBN as the volume % thereof based on the image analysis of the SEM observation results on the polished cross-sectional surfaces of the cBN sintered materials. In terms of the components other than cBN, only the components constituting the main binding phase and the other binding phase were confirmed. Results of the compositional analysis are shown in Table 2.

TABLE 2

| Type | | Cemented carbide backing | cBN (volume %) | Main binding phase | Other binding phase |
|---|---|---|---|---|---|
| cBN sintered material | B-1 | — | 65 | TiN | $Al_2O_3$, $TiB_2$, AlN, and inevitable impurities |
| | B-2 | — | 75 | TiCN | $Al_2O_3$, $TiB_2$, AlN, and inevitable impurities |
| Composite sintered material | B-3 | A-1 | 70 | TiN | $Al_2O_3$, $TiB_2$, AlN, and inevitable impurities |
| | B-4 | A-2 | 76 | TiN | $Al_2O_3$, $TiB_2$, AlN, and inevitable impurities |
| | B-5 | A-3 | 63 | TiCN | $Al_2O_3$, $TiB_2$, AlN, and inevitable impurities |
| | B-6 | A-4 | 72 | TiC | $Al_2O_3$, $TiB_2$, AlN, and inevitable impurities |

Next, the bonding parts having the component compositions and sizes shown in Table 3 were prepared.

Next, the composite parts 1 to 12 of the present inventions shown in Tables 7 and 8 were produced: by interposing the bonding parts shown in Table 3 between: the cemented carbide A-1 to A4; and the cBN sintered materials B-1 to B-2 and the composite sintered materials B-3-B-6; and by performing pressure bonding between the cBN sintered material and the cemented carbide or the composite sintered material and the cemented carbide in the conditions shown in Table 4. The composited sintered materials were arranged in such a way that the cBN sintered material corresponded to the outer surface and the cemented carbide backing became the inner surface. In other words, the cemented carbide backing was bonded to the cemented carbide through the bonding part in this case.

For comparison, the bonding parts having the component compositions and sizes shown in Table 5 were prepared. These were interposed between: the he cemented carbide A-1 to A4; and the cBN sintered materials B-1 to B-2 and the composite sintered materials B-3-B-6. By performing pressure bonding between the cBN sintered material and the cemented carbide or the composite sintered material and the cemented carbide in the conditions shown in Table 6, the composite parts 1 to 12 of Comparative Examples shown in Tables 9 and 10 were produced. Arrangement of the composite sintered materials in bonding was set in the same manner as in the composite parts of the present invention.

TABLE 3

| Type | Bonding part | Ti content ratio (atomic %) | Ni content ratio (atomic %) |
|---|---|---|---|
| C-1 | Ti foil 1 μm/Ni foil 5 μm/Ti foil 1 μm/Ni foil 5 μm/Ti foil 1 μm | 16 | 84 |
| C-2 | Ti foil 1 μm/Ti 50% Ni 50% foil 10 μm/Ti foil 1 μm | 58 | 42 |
| C-3 | Ti 10% Ni 10% Zr 10% Cu 70% foil 15 μm | 10 | 10 |
| C-4 | Ti 20% Ni 20% Cu 60% alloy powder having the average grain size of 0.5 μm to 4 μm | 20 | 20 |

*Numbers after the elemental symbol indicate the atomic ratio of each element.

TABLE 4

| Type | | Type of cemented carbide | Type of cBN sintered material or composite sintered material | Type of bonding part | Bonding condition | | |
|---|---|---|---|---|---|---|---|
| | | | | | Bonding temperature (° C.) | Retention time (minute) | Load (kPa) |
| Composite part of the present invention | 1 | A-1 | B-1 | C-1 | 800 | 60 | 2000 |
| | 2 | A-2 | B-2 | C-2 | 700 | 180 | 3000 |
| | 3 | A-3 | B-3 | C-3 | 900 | 5 | 100 |
| | 4 | A-4 | B-4 | C-4 | 800 | 120 | 500 |
| | 5 | A-1 | B-5 | C-4 | 800 | 30 | 2500 |
| | 6 | A-2 | B-6 | C-3 | 750 | 90 | 2000 |
| | 7 | A-3 | B-1 | C-2 | 850 | 120 | 300 |
| | 8 | A-4 | B-2 | C-1 | 800 | 150 | 300 |
| | 9 | A-1 | B-3 | C-2 | 750 | 60 | 3000 |
| | 10 | A-2 | B-4 | C-4 | 750 | 120 | 1500 |
| | 11 | A-3 | B-5 | C-1 | 850 | 90 | 100 |
| | 12 | A-4 | B-6 | C-3 | 850 | 30 | 2000 |

TABLE 5

| Type | Bonding part | Ti content ratio (atomic %) | Ni content ratio (atomic %) |
|---|---|---|---|
| C-11 | Ti foil 1 μm/Ni foil 15 μm/Ti foil 1 μm | 8 | 92 |
| C-12 | Ti foil 1 μm/Ti 95% Ni 5% foil 10 μm/Ti foil 1 μm | 96 | 4 |

TABLE 5-continued

| Type | Bonding part | Ti content ratio (atomic %) | Ni content ratio (atomic %) |
|---|---|---|---|
| C-13 | Ti 5% Ni 5% Zr 20% Cu 70% foil 15 μm | 5 | 5 |
| C-14 | Ti 5% Ni 5% Cu 90% alloy powder having the average grain size of 0.5 μm to 4 μm | 5 | 5 |

*Numbers after the elemental symbol indicate the atomic ratio of each element.

TABLE 6

| Type | | Type of cemented carbide | Type of cBN sintered material or composite sintered material | Type of bonding part | Bonding condition | | |
|---|---|---|---|---|---|---|---|
| | | | | | Bonding temperature (° C.) | Retention time (minute) | Load (kPa) |
| Composite part of Comparative Example | 1 | A-1 | B-1 | C-11 | 800 | 60 | 2000 |
| | 2 | A-2 | B-2 | C-12 | 700 | 180 | 3000 |
| | 3 | A-3 | B-3 | C-13 | 900 | 5 | 100 |
| | 4 | A-4 | B-4 | C-14 | 800 | 120 | 500 |
| | 5 | A-1 | B-5 | C-13 | 800 | 30 | 2500 |
| | 6 | A-2 | B-6 | C-14 | 750 | 90 | 2000 |
| | 7 | A-3 | B-1 | C-11 | 850 | 120 | 300 |
| | 8 | A-4 | B-2 | C-12 | 800 | 150 | 300 |
| | 9 | A-1 | B-3 | C-2 | *650 | 180 | 3000 |
| | 10 | A-2 | B-4 | C-4 | *1000 | 5 | 300 |
| | 11 | A-3 | B-5 | C-1 | 800 | *3 | *4000 |
| | 12 | A-4 | B-6 | C-3 | 800 | *240 | *50 |

The asterisk mark (*) indicates it is a condition deviated from the scope of the present invention.

High-Temperature Shear Strength Measurement Test:

In order to measure strength of the bonding part, the high-temperature shear strength measurement test was performed on the above-produced the composite parts 1 to 12 of the present invention and the composite parts 1 to 12 of Comparative Examples.

As the test pieces for shear strength measurement, test pieces used for the test were excised from the above-produced the composite parts 1 to 12 of the present invention and the composite parts 1 to 12 of Comparative Examples so as to be the sizes of: the width of 1.5 mm, the length of 1.5 mm, and the height of 0.75 mm for the cBN sintered materials and the composite sintered materials; and the width of 1.5 mm, the length of 4.5 mm, and the height of 1.5 mm for the cemented carbide.

The upper and lower surfaces of each of test pieces were gripped and fixed by a clamp. Then load was subjected on each of test pieces in the middle of the upper surface of the test piece of the hard sintered piece at the atmosphere temperature of 500° C. by using a pressing piece made of cemented carbide in a prismatic shape having a side of 1.5 mm; and the load, by which the hard sintered piece or the support piece were broken off from the cemented carbide, was measured.

The values of the measured shear strength are shown in Tables 7 to 10.

In addition, texture observation and compositional analysis: of the vertical cross-section of the interface between the cemented carbide and the bonding part; and of the vertical cross-section of the interface between the cBN sintered body and the bonding part, were performed on the composite parts 1 to 12 of the present invention and the composite parts 1 to 12 of Comparative Examples by using the electron scanning microscope and the energy dispersive X-ray spectrometer.

The vertical cross-sectional observation on the interface between the cemented carbide and the bonding part was performed in the view field set in such a way that the cemented carbide occupied 5% to 10% of the observation region. Elemental mapping was performed in the view field magnified 10,000 times. Formation of the primarily TiC layer and the Ti—Ni enriched layer in the interface between the cemented carbide and the bonding part was confirmed. At the same time, the component composition of each layer was obtained by performing the 10-points analysis and calculating the average value from the 10-points analysis.

In addition, 10-points analysis was performed on the intermittent net structure formed adjacent to the primarily TiC layer; and by calculating the average value from the 10-points analysis, the component composition of the intermittent net structure was obtained.

In terms of the average layer thickness of the primarily TiC layer and the Ti—Ni enriched layer, each of the average layers was obtained by: drawing the straight line orthogonal to the interface between the cemented carbide and the bonding part from the interface; obtaining the length from the interface to the end of each layer; and obtaining the average value from 10-points measurement performed.

In terms of the average width and the average intersected grain number by the extended straight line of the intermittent net structure, the longest size was defined as the size in the longitudinal direction; and the longest size in the orthogonal direction of the size in the longitudinal direction was defined as the width of the crystal grain on each of the net structure crystals. Finally, the number of the other net structure crystal grains intersected by the straight line overlapping to the size in the longitudinal direction in the view field was obtained. The width of the crystal grain and the number of grains intersected by the extended straight line were obtained on each of the net structure crystals in the view field; and the average width and the average intersected grain number by the extended straight line of the intermittent net structure 7 were obtained by dividing the sums of each value by the number of the net structure crystals.

The contents of Ti, B, and N of the needle structure containing Ti, B, and N adjacent to the cBN grains in the interface between the cBN sintered material and the bonding part were obtained in the same manner as described above.

In addition, in terms of the needle structure, the average size in the longitudinal direction and the average aspect ratio are obtained: by defining the longest size as the size in the longitudinal direction on each of 10 crystal grains constituting the needle structure in the view field; by defining the longest size orthogonal to the longitudinal direction as the size in the traversing direction; by obtaining the aspect ratio by dividing the size in the longitudinal direction by the size in the traversing direction; and by calculating average values of the 10 crystal grains. The results are shown in Tables 7 to 10.

TABLE 7

| | | Interface between the bonding part and the cemented carbide ||||||||
| | | Primarily TiC layer || Ti—Ni enriched layer ||| Intermittent net structure ||||
| Type | | Ave. layer thickness (μm) | Area ratio (area %) | Ave. layer thickness (μm) | Ti content (atomic %) | Ni content (atomic %) | Ave. layer width (μm) | Ave. number of grains intersected by the extended straight line | Ti content (atomic %) | Ni content (atomic %) | C content (atomic %) |
|---|---|---|---|---|---|---|---|---|---|---|---|
| Composite part of the present invention | 1 | 1.5 | 63 | 2.5 | 41 | 69 | 100 | 6 | 15 | 25 | 41 |
| | 2 | 0.5 | 80 | 1.5 | 55 | 45 | 10 | 10 | 26 | 22 | 48 |
| | 7 | 2.3 | 71 | 1.8 | 52 | 48 | 170 | 4 | 27 | 20 | 44 |
| | 8 | 1.5 | 76 | 2.6 | 40 | 60 | 90 | 4 | 14 | 28 | 43 |

| | | Interface between the binding part and the cBN sintered material Needle structure |||||| |
| Type | | Ave. size in the longitudinal direction (nm) | Ave. aspect ratio | Ti content (atomic %) | B content (atomic %) | N content (atomic %) | Shear strength (kgf/mm²) |
|---|---|---|---|---|---|---|---|
| Composite part of the present invention | 1 | 1.6 | 7 | 10 | 10 | 15 | 26 |
| | 2 | 0.1 | 5 | 26 | 14 | 18 | 25 |
| | 7 | 3 | 10 | 31 | 16 | 16 | 25 |
| | 8 | 1.5 | 8 | 14 | 16 | 10 | 26 |

\* The energy dispersive X-ray spectrometer was used for the alloy composition analysis.

"—" in the table indicates it is below the detection limit.

TABLE 8

| | | Interface between the bonding part and the cemented carbide |||||||
| | | Primarily TiC layer || Ti—Ni enriched layer ||| Intermittent net structure |||
| Type | | Ave. layer thickness (μm) | Area ratio (area %) | Ave. layer thickness (μm) | Ti content (atomic %) | Ni content (atomic %) | Ave. layer width (μm) | Ave. number of grains intersected by the extended straight line | Ti content (atomic %) |
|---|---|---|---|---|---|---|---|---|---|
| Composite part of the present invention | 3 | 3.0 | 50 | 0.6 | 30 | 33 | 200 | 3 | 17 |
| | 4 | 1.7 | 69 | 1.1 | 43 | 41 | 110 | 5 | 20 |
| | 5 | 1.7 | 57 | 1.0 | 44 | 43 | 100 | 8 | 21 |
| | 6 | 1.0 | 65 | 0.3 | 35 | 37 | 50 | 7 | 13 |
| | 9 | 0.9 | 62 | 1.7 | 53 | 47 | 40 | 10 | 25 |
| | 10 | 0.8 | 70 | 0.7 | 43 | 34 | 50 | 5 | 22 |
| | 11 | 2.5 | 66 | 3.0 | 39 | 61 | 160 | 5 | 17 |
| | 12 | 2.2 | 59 | 0.5 | 37 | 30 | 180 | 7 | 10 |

TABLE 8-continued

| | | Interface between the bonding part and the cemented carbide Intermittent net structure | | Interface between the bonding part and the cemented carbide backing | | | | |
|---|---|---|---|---|---|---|---|---|
| | | | | Primarily TiC layer | | Ti—Ni enriched layer | | |
| Type | | Ni content (atomic %) | C content (atomic %) | Ave. layer thickness (μm) | Area ratio (area %) | Ave. layer thickness (μm) | Ti content (atomic %) | Ni content (atomic %) |
| Composite part of the present invention | 3 | 18 | 10 | 2.7 | 55 | 0.7 | 32 | 31 |
| | 4 | 21 | 44 | 1.5 | 71 | 1.2 | 40 | 41 |
| | 5 | 22 | 40 | 1.5 | 61 | 1.0 | 41 | 40 |
| | 6 | 10 | 20 | 0.9 | 62 | 0.5 | 39 | 39 |
| | 9 | 23 | 45 | 0.9 | 61 | 1.5 | 52 | 48 |
| | 10 | 20 | 39 | 1.0 | 70 | 0.9 | 45 | 34 |
| | 11 | 25 | 45 | 2.4 | 67 | 2.8 | 40 | 60 |
| | 12 | 15 | 26 | 2.2 | 60 | 0.6 | 36 | 32 |

| | | Interface between the bonding part and the cemented carbide backing Intermittent net structure | | | | | |
|---|---|---|---|---|---|---|---|
| Type | | Ave. layer thickness (μm) | Ave. number of grains intersected by the extended straight line | Ti content (atomic %) | Ni content (atomic %) | C content (atomic %) | Shear strength (kgf/mm²) |
| Composite part of the present invention | 3 | 160 | 4 | 18 | 17 | 15 | 30 |
| | 4 | 100 | 5 | 19 | 19 | 45 | 29 |
| | 5 | 110 | 9 | 20 | 22 | 41 | 29 |
| | 6 | 60 | 8 | 14 | 12 | 23 | 27 |
| | 9 | 50 | 10 | 26 | 21 | 41 | 31 |
| | 10 | 50 | 6 | 20 | 22 | 37 | 29 |
| | 11 | 150 | 5 | 19 | 25 | 46 | 29 |
| | 12 | 170 | 8 | 12 | 14 | 28 | 28 |

\* The energy dispersive X-ray spectrometer was used for the alloy composition analysis.
"—" in the table indicates it is below the detection limit.

TABLE 9

| | | Interface between the bonding part and the cemented carbide | | | | | | | | |
|---|---|---|---|---|---|---|---|---|---|---|
| | | Primarily TiC layer | | Ti—Ni enriched layer | | | Intermittent net structure | | | |
| | | | | | | | | Ave. number of grains intersected by the extended straight line | | |
| Type | | Ave. layer thickness (μm) | Area ratio (area %) | Ave. layer thickness (μm) | Ti content (atomic %) | Ni content (atomic %) | Ave. layer width (μm) | | Ti content (atomic %) | Ni content (atomic %) | C content (atomic %) |
| Composite part of Comparative Example | 1 | 1.1 | 65 | 2.0 | *20 | 80 | 100 | 5 | *5 | 31 | 39 |
| | 2 | 0.5 | 55 | 1.1 | 86 | *14 | 10 | 7 | 35 | *3 | 48 |
| | 7 | 2.1 | 66 | 1.5 | *6 | 94 | 130 | 3 | *3 | 18 | 32 |
| | 8 | 1.3 | 77 | 2.1 | 96 | *4 | 80 | 3 | 13 | *2 | 31 |

| | | Interface between the binding part and the cBN sintered material Needle structure | | | | | |
|---|---|---|---|---|---|---|---|
| Type | | Ave. size in the longitudinal direction (nm) | Ave. aspect ratio | Ti content (atomic %) | B content (atomic %) | N content (atomic %) | Shear strength (kgf/mm²) |
| Composite part of | 1 | *— | *— | *— | *— | *— | 5 |
| | 2 | *0.05 | *1 | *4 | *5 | *5 | 7 |

TABLE 9-continued

|  |  |  |  |  |  |  |
|---|---|---|---|---|---|---|
| Comparative | 7 | *— | *— | *— | *— | *— | 5 |
| Example | 8 | *4.2 | 5 | *5 | *6 | *5 | 8 |

The asterisk mark (*) indicates that it is deviated from the scope of the present invention.
The energy dispersive X-ray spectrometer was used for the alloy composition analysis.
"—" in the table indicates it is below the detection limit.

TABLE 10

| | | Interface between the bonding part and the cemented carbide | | | | | | |
|---|---|---|---|---|---|---|---|---|
| | | Primarily TiC layer | | Ti—Ni enriched layer | | | Intermittent net structure | |
| Type | | Ave. layer thickness (μm) | Area ratio (area %) | Ave. layer thickness (μm) | Ti content (atomic %) | Ni content (atomic %) | Ave. layer width (μm) | Ave. number of grains intersected by the extended straight line | Ti content (atomic %) |
| Composite part of Comparative Example | 3 | 2.2 | 51 | 0.5 | *21 | *20 | 180 | 3 | *4 |
| | 4 | 1.3 | 61 | 0.8 | *10 | *10 | 90 | 4 | *1 |
| | 5 | 1.5 | 52 | 0.5 | *5 | *8 | 60 | 5 | *3 |
| | 6 | 0.8 | 62 | 0.3 | *12 | *11 | 30 | 4 | *5 |
| | 9 | *0.3 | 55 | 1.4 | 50 | 50 | *— | *— | *— |
| | 10 | *4.0 | 62 | 0.5 | 41 | 35 | *400 | 4 | 21 |
| | 11 | 2.2 | *40 | *4.5 | 36 | 64 | 140 | *1 | 15 |
| | 12 | 1.8 | *40 | *0.1 | 31 | 33 | 150 | *1 | 12 |

| | | Interface between the bonding part and the cemented carbide Intermittent net structure | | Interface between the bonding part and the cemented carbide backing | | | | |
|---|---|---|---|---|---|---|---|---|
| | | | | Primarily TiC layer | | Ti—Ni enriched layer | | |
| Type | | Ni content (atomic %) | C content (atomic %) | Ave. layer thickness (μm) | Area ratio (area %) | Ave. layer thickness (μm) | Ti content (atomic %) | Ni content (atomic %) |
| Composite part of Comparative Example | 3 | *5 | 10 | 2.1 | 55 | 0.4 | *20 | *21 |
| | 4 | *2 | *5 | 1.2 | 59 | 0.9 | *10 | *10 |
| | 5 | *4 | *7 | 1.4 | 53 | 0.6 | *5 | *8 |
| | 6 | *5 | *8 | 0.7 | 65 | 0.3 | *12 | *11 |
| | 9 | *— | *— | *0.1 | 58 | 1.5 | 52 | 48 |
| | 10 | 21 | 40 | *4.5 | 68 | 0.6 | 39 | 38 |
| | 11 | 22 | 41 | 2.0 | *40 | *4.5 | 33 | 67 |
| | 12 | 14 | 25 | 1.9 | *40 | *0.1 | 30 | 33 |

| | | Interface between the bonding part and the cemented carbide backing Intermittent net structure | | | | | |
|---|---|---|---|---|---|---|---|
| Type | | Ave. layer width (μm) | Ave. number of grains intersected by the extended straight line | Ti content (atomic %) | Ni content (atomic %) | C content (atomic %) | Shear strength (kgf/mm$^2$) |
| Composite part of Comparative Example | 3 | 190 | 3 | *5 | *4 | 11 | 16 |
| | 4 | 100 | 5 | *2 | *1 | *4 | 15 |
| | 5 | 70 | 5 | *3 | *3 | *6 | 14 |
| | 6 | 20 | 4 | *6 | *2 | *8 | 15 |
| | 9 | *— | *— | *— | *— | *— | 11 |
| | 10 | *400 | 4 | 20 | 22 | 39 | 20 |
| | 11 | 130 | *0 | 15 | 21 | 40 | 18 |
| | 12 | 130 | *1 | 11 | 13 | 22 | 17 |

The asterisk mark (*) indicates that it is deviated from the scope of the present invention.
The energy dispersive X-ray spectrometer was used for the alloy composition analysis.
"—" in the table indicates it is below the detection limit.

Next, cutting tools made of the composite parts 1 to 12 of the present invention and the composite parts 1 to 12 of Comparative Examples were produced; and the presence or the absence of breakage in cutting work were investigated.

The cutting tools made of the composite parts were produced as described below.

The above-produced cBN sintered materials B-1 to B-2 and the composite sintered materials B-3 to B-6 were cut off in the dimension of: the planar shape of the isosceles triangle with the opening angle of 80° and a side of 4 mm; and the thickness of 2 mm. Then, the cemented carbide A-1 to A4 were used as the sintered materials having the dimension of: the planar shape of the diamond with the inscribed circle having the diameter of 12.7 mm and the opening angle of 80°; and the thickness of 4.76 mm. Then, a notch, the size of which matched to the shape of the above-described cBN sintered materials and the composite sintered materials, was formed on a corner of one surface among the upper and lower surfaces of the sintered materials. The area of bottom surface of the notch was 2.96 mm$^2$; and the side surface area was 4.89 mm$^2$. Next, the bonding parts shown in Table 3 were interposed between: the cemented carbide A-1 to A-4; and the cBN sintered materials B-1 to B-2 and the composite sintered materials B-3 to B-6; and the cBN sintered materials and the cemented carbide or the composite sintered materials and the cemented carbide were pressure-bonded in the conditions shown in Table 4. Then, by performing honing work of R: 0.07 mm on the cutting edge parts after polishing the outer circumference of the composite parts, the cutting tools 1 to 12 of the present invention having the insert shape of CNGA120408 in the ISO standard were produced. The composited sintered materials were arranged in such a way that the cBN sintered material corresponded to the outer surface and the cemented carbide backing became the inner surface. In other words, the cemented carbide backing was bonded to the cemented carbide through the bonding part. It was confirmed that the bonding parts of these cutting tools 1 to 12 of the present invention were practically the same as the ones of the composite parts 1 to 12 of the present invention shown in Tables 7 and 8.

Similarly, the cutting tools 1 to 12 of Comparative Examples were produced by: interposing the bonding parts shown in Table 5 between: the above-produced cemented carbide A-1 to A-4; and the above-produced cBN sintered materials B-1 to B-2 and the composite sintered parts B-3 to B-6; and performing pressure bonding in the conditions shown in Table 6. It was confirmed that the bonding parts of these cutting tools 1 to 12 of Comparative Examples were practically the same as the ones of the composite parts 1 to 12 of Comparative Examples shown in Tables 9 and 10.

Next, the high-speed continuous dry cutting test of the carbolized steel was performed on the cutting tools 1 to 12 of the present invention and the cutting tools 1 to 12 of Comparative Examples in the state where each of the cutting tools was screwed on the apical portion of the insert holder of tool steel with the fixing jig under the condition shown below; and falling off of the cutting edge part and the location of the broken part were observed.

Work: Round bar, JIS-SCM415 (hardness: 58 HRc)
Cutting speed: 200 m/min.
Cutting depth: 0.2 mm
Feed: 0.2 mm/rev.
Cutting time: 40 minutes
(Standard cutting speed: 100 m/min.)
Results of the cutting test are shown in Table 11.

TABLE 11

| Type | | Presence or absence of peeling off of the cutting edge | Type | | Presence or absence of peeling off of the cutting edge | Location of breakage |
|---|---|---|---|---|---|---|
| Cutting tool of the present invention | 1 | Absent | Cutting tool of Comparative Example | 1 | Present | Interface between the bonding part and the cBN sintered material |
| | 2 | Absent | | 2 | Present | Interface between the bonding part and the cBN sintered material |
| | 3 | Absent | | 3 | Present | Inside of the bonding part |
| | 4 | Absent | | 4 | Present | Interface between the bonding part and the cemented carbide backing |
| | 5 | Absent | | 5 | Present | Inside of the bonding part |
| | 6 | Absent | | 6 | Present | Interface between the bonding part and the cemented carbide |
| | 7 | Absent | | 7 | Present | Interface between the bonding part and the cBN sintered material |
| | 8 | Absent | | 8 | Present | Interface between the bonding part and the cBN sintered material |
| | 9 | Absent | | 9 | Present | Interface between the bonding part and the cemented carbide backing |
| | 10 | Absent | | 10 | Present | Interface between the bonding part and the cemented carbide backing |

TABLE 11-continued

| Type | Presence or absence of peeling off of the cutting edge | Type | Presence or absence of peeling off of the cutting edge | Location of breakage |
|---|---|---|---|---|
| 11 | Absent | 11 | Present | Interface between the bonding part and the cemented carbide backing |
| 12 | Absent | 12 | Present | Interface between the bonding part and the cemented carbide backing |

Based on the shear strength values shown in Tables 7 to 10, it is demonstrated that the composite parts 1 to 12 of the present invention have bonding strength superior to the composite parts 1 to 12 of Comparative Examples.

In addition, based on the results shown in Table 11, it was demonstrated that there was no falling off of the cutting edge in the cutting tools 1 to 12 of the present invention constituted of the composite parts 1 to 12 of the present invention; and they exhibited excellent cutting performance for a long-term usage. On the other hand, it was demonstrated that there was falling off of the cutting edge from the bonding part during cutting in the cutting tools 1 to 12 of Comparative Examples constituted from the composite parts 1 to 12 of Comparative Examples; and they reached to their service lives in the early stage.

In the present Examples, it is explained specifically by taking the insert as an example. However, the present invention is not particularly limited for usage as the insert, and it is indisputable that the present invention can be applicable to any one of cutting tool having the bonding part between the cutting edge part and the main body of the cutting tool, such as drills, end mills, and the like.

INDUSTRIAL APPLICABILITY

Bonding strength is high in the composite part of the present invention; and the cutting tool made of this composite part can be utilized in high-load cutting work on varieties of steel, cast iron, Al—SiC composite material, and the like. Moreover, the cutting tool exhibits stable cutting performance for a long period of time. Thus, the present invention sufficiently contributes to: adapting to the high-performance cutting equipment; and satisfying demands for power-saving, energy-saving, and cost-reduction in cutting work.

REFERENCE SIGNS LIST

1: Composite part
2: Cutting edge part
3: Bonding part
4: Cutting tool body made of WC-based cemented carbide (Cutting tool body)
5: Bonding surface of the cutting edge part
6: Bonding surface of the cutting tool main body
7: Intermittent net structure
8: Ti—Ni enriched layer
9: Primarily TiC layer
10: cBN crystal grain
11: Needle structure

The invention claimed is:

1. A composite part comprising:
    a cutting edge part made of cubic boron nitride sintered material or WC-based cemented carbide and containing a cutting edge;
    a cutting tool body made of WC-based cemented carbide; and
    a bonding part provided between the cutting edge part and the cutting tool body and bonding the cutting edge part and the cutting tool body, wherein
    (a) a primarily TiC layer containing 50 area % or more of TiC is formed in an interface between the cutting tool body and the bonding part, the primarily TiC layer having an average layer thickness of 0.5 μm to 3 μm,
    (b) a Ti—Ni enriched layer containing each of Ti and Ni at 30 atomic % or more is formed adjacent to the primarily TiC layer, the Ti—Ni enriched layer having an average layer thickness of 0.3 μm to 3 μm,
    (c) an intermittent net structure is formed in the bonding part adjacent to the primarily TiC layer and overlaps the Ti—Ni enriched layer, the intermittent net structure having crystal grains, each of which has an average width of 10 nm to 200 nm and contains Ti, Ni, and C in 10 atomic % or more, and
    (d) the intermittent net structure is formed such that a line extending in a longitudinal direction of each of the crystal grains intersects on average at least 3 other crystal grains.

2. The composite part according to claim 1, wherein a TiC content in the primarily TiC layer is 80 area % or less.

3. The composite part according to claim 1, wherein a Ti content in the Ti—Ni enriched layer is 55 atomic % or less.

4. The composite part according to claim 1, wherein a Ti content in the Ti—Ni enriched layer is 40 atomic % or more and 55 atomic % or less.

5. The composite part according to claim 1, wherein a Ni content in the Ti—Ni enriched layer is 70 atomic % or less.

6. The composite part according to claim 1, wherein a Ni content in the Ti—Ni enriched layer is 45 atomic % or more and 70 atomic % or less.

7. The composite part according to claim 1, wherein
    the cutting edge part is made of cubic boron nitride sintered material, and
    a needle structure containing each of Ti, B, and N at 10 atomic % or more is formed adjacent to the cubic boron nitride grains on the side of the bonding part in the interface between the cubic boron nitride sintered material and the bonding part, the needle structure having an average size in a longitudinal direction of 0.1 μm to 3 μm and an average aspect ratio of 5 or more.

8. A cutting tool comprising the composite part according to claim 1.

9. The composite part according to claim 1, wherein the intermittent net structure has a portion that extends vertically through the Ti—Ni enriched layer.

* * * * *